United States Patent

[11] 3,622,885

[72] Inventors Tadeusz Kruszynski Oberdorf; Hans Van Der Floe, Selzach; Fritz Eggiman, Oberengstringen; Ekkehard A. Wildhaber, Windisch, all of Switzerland

[21] Appl. No. 843,594
[22] Filed July 22, 1969
[45] Patented Nov. 23, 1971
[73] Assignee Autophon Aktiengesellschaft Solothurn, Switzerland
[32] Priority July 26, 1968
[33] Switzerland
[31] 11281/68

[54] SYSTEM FOR THE PARALLEL TRANSMISSION OF SIGNALS
9 Claims, 18 Drawing Figs.

[52] U.S. Cl. .......... 325/40, 178/66, 179/15.55, 325/59, 325/141, 325/38 B
[51] Int. Cl. .......... H04b 1/66, H04l 3/00
[50] Field of Search .......... 325/30, 38, 40, 42, 44, 59, 60, 61.65, 52; 178/66; 179/15 AA, 15.55

[56] References Cited

UNITED STATES PATENTS

| | | | |
|---|---|---|---|
| 2,759,998 | 8/1956 | Labin et al. | 325/44 |
| 3,330,909 | 7/1967 | Willson | 325/30 X |
| 3,348,203 | 10/1967 | Allen | 179/15.55 X |
| 3,378,641 | 4/1968 | Varsos et al. | 179/15.55 |
| 3,471,646 | 10/1969 | Magnuski et al. | 179/15 |
| 3,485,949 | 12/1969 | Haas | 178/67 |
| 3,523,250 | 8/1970 | Branham | 325/40 X |

*Primary Examiner*—Benedict V. Safourek
*Attorney*—Stevens, Davis, Miller & Mosher

ABSTRACT: A system for transmission of continuous signals wherein the signals are sampled into sections, which sections are subsequently assembled into groups. A frequency band is permanently associated with each section dependent upon its position within the group and for each section an alternating-current pulse is produced, the frequency of said alternating-current pulse being within the frequency band associated with said section and which contains the signal contents of the corresponding section. The alternating-current pulses are longer than the sections and are temporarily overlapping one another.

SYSTEM FOR THE PARALLEL TRANSMISSION OF SIGNALS

The present invention relates to a system for the transmission of a first continuous signal by means of a second signal which consists of separate signal sections each lying in at least two frequency bands. The system contains first switch means for sampling the first signal into first sections and to form groups of such first sections. The system furthermore contains second switch means which produce and give off second sections of the second signal and which associate a frequency band and a single second section lying in said frequency band with each first section depending on its position in time within its group. The second switch means act on each second signal section on the basis of the message content of the section associated with it of the first signal in such a manner that it contains the message content of the first section corresponding to it. The system furthermore contains third switch means for converting the second signal back into the first signal.

Systems of this type are known which serve to convert a continuous signal into groups of pulses, these groups being so spaced from each other that, together with corresponding groups produced by other systems, they can be used in a nonsynchronous transmission system. These groups of pulses are composed of different frequencies produced in part simultaneously and arranged in accordance with a given code. Enabled by the code, a selective recognition of these groups of pulses is possible by a receiving device even when they are mixed with other similar signals. In such systems, however, difficulties occur when the signals are to be transmitted over wireless paths having differences in transmission time. These differences in transmission time have a disturbing effect inasmuch as a short signal which is sent out is received either as a multiple signal or as an irregular signal which is drawn out in length. The lengthening of the groups of pulses results in a stronger occupation of the channel, as a result of which the signal to noise ratio is reduced or, assuming constant noise level, fewer messages can be transmitted over the same channel.

Larger transmission time differences, however, make their presence disturbingly felt in the case of transmissions with systems of the aforementioned type, even if time multiplex transmission is not effected. One such system is known in which the transmission is insensitive, to a certain degree, to differences in transmission time. In this system, a continuous signal is first converted into a pulse code modulated signal, whereupon a high-frequency pulse of the same length is formed from each pulse of said signal and said pulses are sent out in unchanged time sequence. Each pulse within a group of pulses formed by the coding is in this connection assigned a different frequency so that overlappings in time of pulses forming one group, which are caused by differences in transmission time, remain without effect. For example, differences in transmission time which are practically equal to the spacing of the groups are permitted.

Although such an improvement is, in many cases, decisive, in other cases it is not, since differences in transmission time have been measured, the duration of which exceeds that of the longest sections which can still be permitted upon the subdividing of a speech signal for pulse modulation. Under such conditions, even a continuously transmitted speech signal can no longer be suitably received. Remedies for disturbances in transmission, which are caused by transmission time differences, are in principle only possible if the pulses sent out are lengthened to a value which corresponds at least to the largest difference in transmission time. Under these conditions, a steady state which permits proper evaluation is established for each pulse at the place of reception.

Another system is known in which a plurality of pulse amplitude modulated series of pulses, which together form a time multiplex signal, are transformed into a frequency multiplex signal by lengthening and delaying for different periods of time the incoming signals by means of a delay line with frequency dependent transmission time which acts as storage. In the frequency multiplex signal, which is thereby formed, the (lengthened) pulses obtained therein which correspond to a group of pulses of a time multiplex signal do not intersect in time and the signal does not differ from one produced in the traditional manner by modulators and filters, so that this system does not afford any advantages as to transmission technique over other frequency multiplex systems.

The disturbing effect of the transmission time differences on the channel occupation is nonsynchronous time multiplex systems, which was mentioned above, can only be reduced if the intervals in time between the transmitted groups of pulses are increased and thus their number reduced. By these measures, the relative influence of the lengthening is reduced, since the absolute value of the lengthening of the groups of pulses is independent of the nature of these groups. In order to achieve this purpose, the message content of the individual groups must of course be increased, assuming one and the same message flow. Until now, however, no systems have become known with which such requirement can be satisfied.

The present invention now makes it possible to simultaneously satisfy different demands which would appear to be contradictory to each other. It permits the construction of systems which send out pulses of constant frequency and amplitude and the length of which exceeds the greatest differences in transmission time to be expected. This length is in no way limited, in this connection, to the greatest length of the sections in which the input signal can still be divided. In this way a dependable transmission of signals is made possible even with very large differences in transmission time.

The invention furthermore makes it possible, while retaining the aforementioned possibilities, to develop a transmission system which can be incorporated in a nonsynchronous time multiplex system. In this connection it is possible to arrange the information in stacks which have a relatively large time spacing delimited only by the expense of the system. It is therefore possible to maintain the disturbances small by the lengthenings in the stacks which occur as a result of transmission time differences.

The invention, however, is not limited to a system which produces a signal consisting of stacks. It can also be used in systems in which a continuous signal having more than one frequency is produced. Such a system affords the advantage, as compared with a system which sends out a normal continuous signal having a single frequency, that there are contained in the signal given off by its sections of constant frequency and amplitude which are longer than the sections into which the input signal can be divided, and thereby makes possible better transmission in cases with extremely larger differences in transmission time.

The system in accordance with the invention is characterized by storage switch means which, in cooperation with the second switch means, delay the giving off of at least parts of the second sections as compared with the occurrence in time of the first sections corresponding to them in the manner that at least parts of different second sections which lie in different frequency bands and which correspond to different first sections belonging to the same group are given off simultaneously.

The means for accomplishing the foregoing objects and other advantages, which will be apparent to those skilled in the art, are set forth in the following specification and claims, and are illustrated in the accompanying drawings dealing with six examples of the present invention. Reference is made now to the drawings in which FIG. 1 is a block diagram of a device belonging to a first system for the conversion of a continuous low-frequency signal into a signal consisting of stacks of signal sections, the conversion being effected by means of a pulse amplitude modulation;

Figure 1:
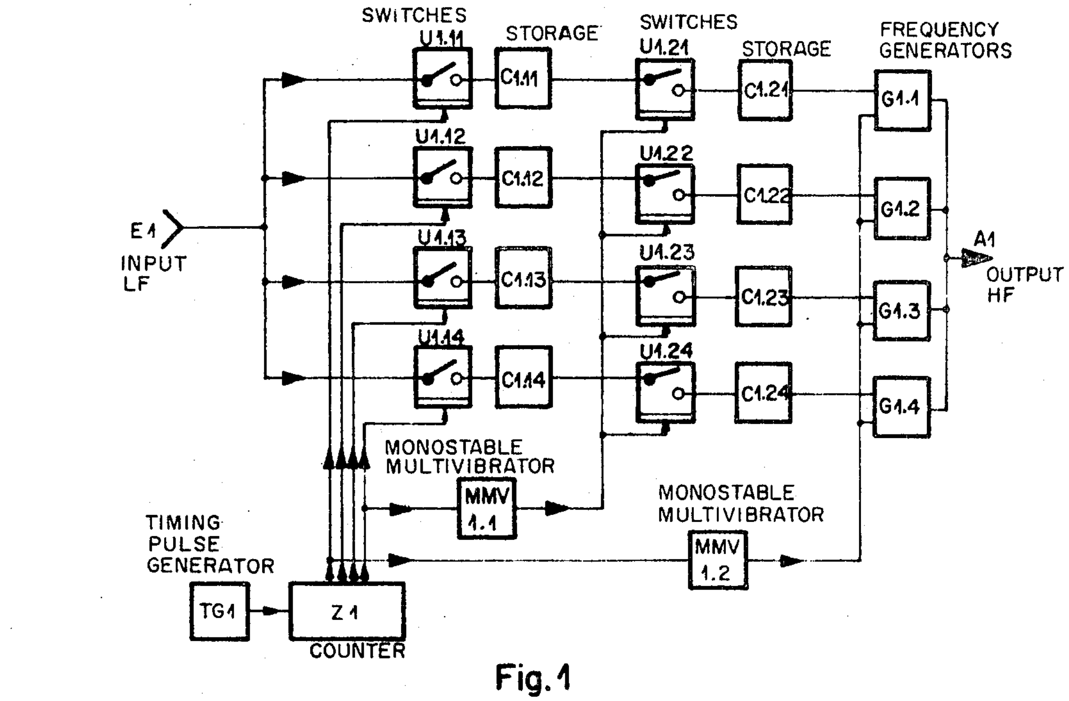
Figure 3:
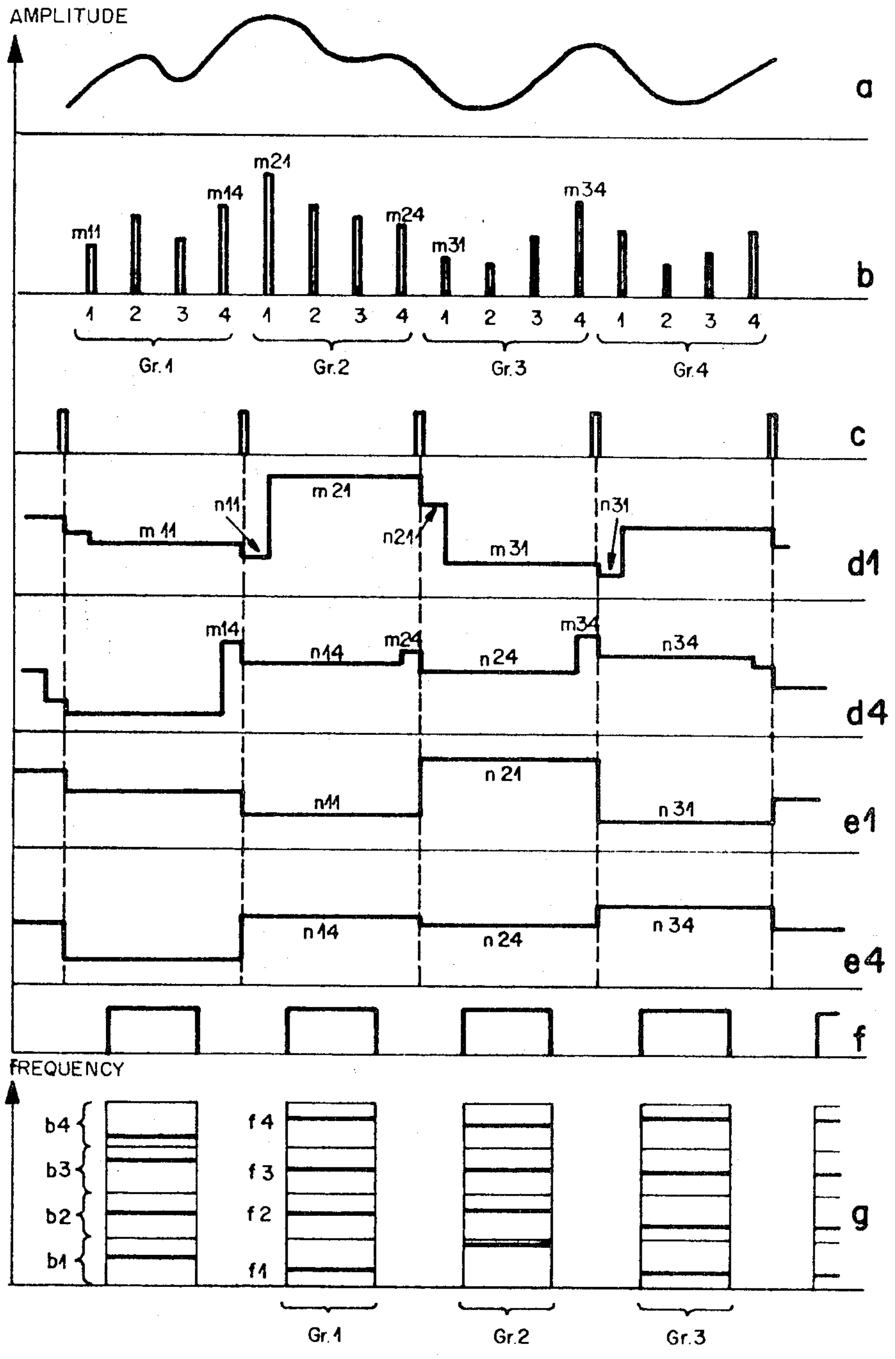
FIGS. 3a to 3g show the amplitude and frequency of the signals for a device according to FIG. 1.

The device according to the block diagram shown in FIG. 1 is fed at input E1 by a continuous low-frequency signal such as shown, for instance, in FIG. 3a. This signal arrives in parallel at the inputs of four electronic switches U1.11...U1.14. By means of the counter Z1, short pulses produced by a pulse generator TG1 are alternately applied to the control inputs of the switches. Each output of a switch leads to a storage formed by a respective capacitor C1.11...C1.14. Each of these storage capacitors in turn are connected to the input of another switch U1.21...U1.24 each of the outputs of which in turn leads to another storage C1.21...C1.24 formed by a capacitor. The control inputs of the switches U1.21...U1.24 are connected in parallel and are fed with pulses from an output of the counter Z1 via a monostable multivibrator MMV1.1.

There are furthermore provided four generators G1.1...G1.4 the output signals of each of which lies in different frequency bands and the frequency of which can be changed within the corresponding bands by a voltage fed from the corresponding storage C1.21...C1.24. The generators are put into operation by pulses given off from the counter Z1 with the interposition of the monostable multivibrator MMV1.2. Their outputs lead in parallel to the output A1.

Figure 4:
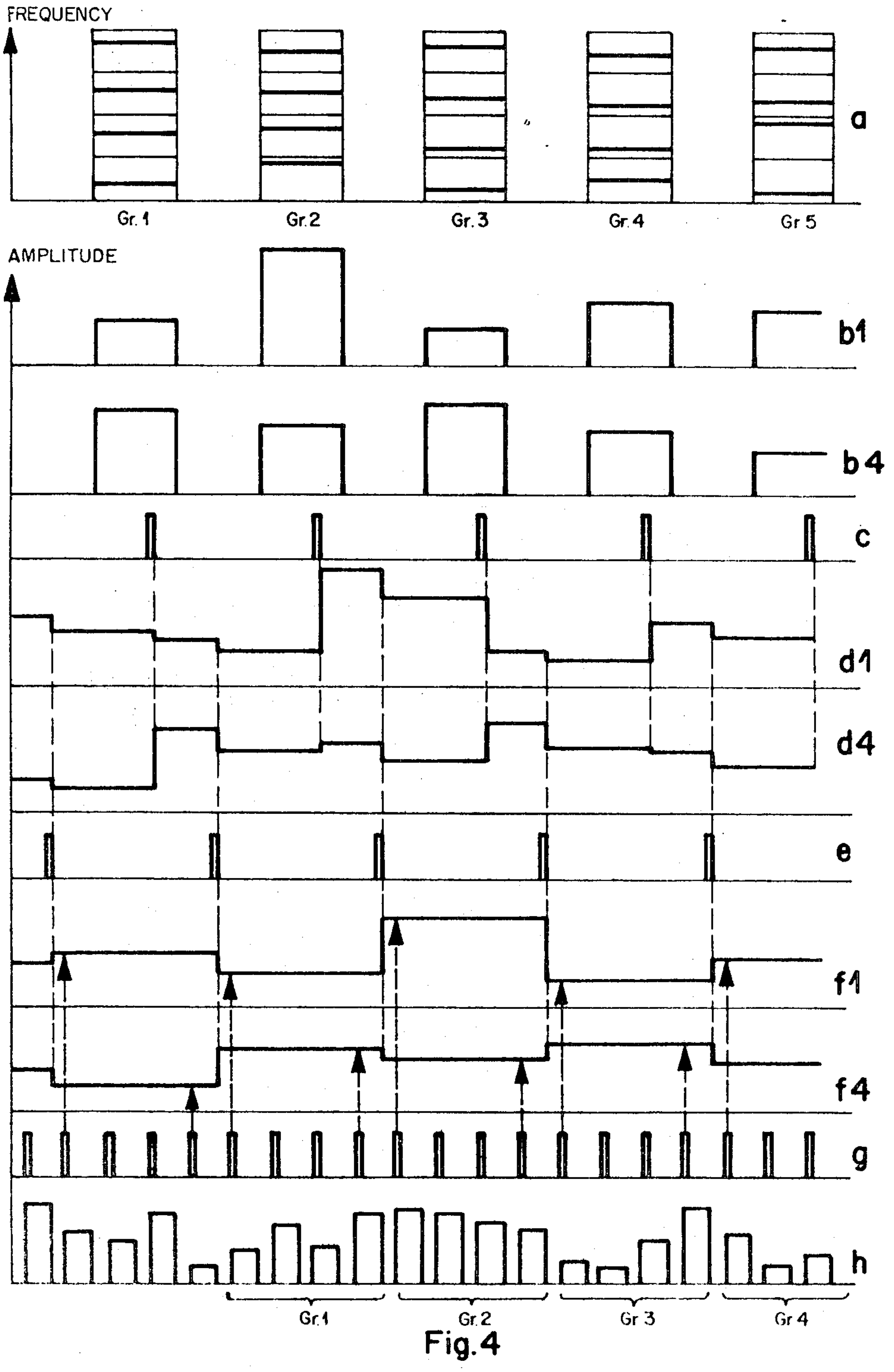
FIGS. 4a to 4h show the amplitude and frequency of the signals for a device in accordance with FIG. 2.

With the aid of the timing pulses given off by the timing-pulse generator TG1, the input signal is converted into a pulse amplitude modulated signal the pulse frequency of which, as in any pulse modulation, must be at least twice as high as the highest of the low frequencies to be transmitted. The pulses produced by the timing-pulse generator TG1 are arranged in groups of fours by the counter Zl. The first pulse of a group of fours is fed to the switch U1.11, the second to the switch U1.12, etc., whereby the capacitors C1.11...C1.14, which act as storages, are each charged one after the other with a voltage which corresponds to the instantaneous value of the low-frequency signal E1 during the pulse which closes the switch in question. The pulses with a voltage dependent on the signal in accordance with FIG. 3a, which are produced at the outputs of the switches U1.11...U1.14, are shown in FIG. 3b. In this figure, the numbers 1...4, indicate which switch shaped the corresponding pulse, while Gr.1, Gr.2, etc., indicate groups of pulses, one pulse coming from each switch being represented in each case in each group. Of the amplitude values *m* of the pulses shown in FIG. 3b, the first and the fourth are designated by *m*11, *m*14, *m*21, *m*24, etc. In FIGS. 3d1 and 3d4, there are shown the variations of voltage at the storages C1.11 and C1.14, each of which is charged after the closing of the corresponding switch U1.11...U1.14 to the voltage of the corresponding pulse. The voltage values are designated the same as in FIG. 3b.

After the four timing pulses belonging to a group are imparted to the switches U1.11...U1.14 and the capacitors C1.11...C1.14 have been charged corresponding to the amplitude values of the low-frequency signal (FIG. 3a), the monostable multivibrator MMV1.1 produces, after the fourth pulse, a group separation pulse shown in FIG. 3c which follows the fourth pulse of the group of half a pulse spacing so that it is located in the center between the last pulse of one group and the first pulse of the following group. Such a pulse closes the switches U1.21...U1.24 simultaneously, whereby the capacitors C1.21...C1.24, acting as second storage, are charged with voltages which are proportional to the voltages previously present on the capacitors C1.11...C1.14 corresponding to the ratio of the capacities to each other. The course of the voltages at the capacitors C1.21 and C1.24 is shown in FIGS. 3e1 and 3e4. The voltages proportional to the original voltages present at the storages C1.11...C1.14 are designated by *n* and bear the same subscripts as the voltages *m* from which they are derived. In FIGS. 3d1 and 3d4, there can clearly be noted the decrease of the voltages from the *m* to the *n* values which takes place during the pulses in accordance with FIG. 3c. It was assumed in this connection that the capacity of the capacitors C1.11...C1.14 is substantially greater than that of the capacitors C1.21...C1.24.

Two monostable multivibrators, which are connected one behind the other are designated generally as MMV1.2 and are excited by the first pulse of a group produced by the pulse generator, give off a pulse (FIG. 3f) which exceeds the duration and the spacing of the pulses produced by the pulse generator TG1 and the commencement of which can, within certain limits, be at any desired distance from said first pulse. During this pulse, all four generators G1.1...G1.4 are simultaneously placed in operation. Together they produce a signal stack consisting of four frequencies. The frequency-time diagrams of such stacks, each of which corresponds to the section of the low-frequency signal which has arrived at the input during the production of a group of pulses by the pulse generator TG1, are shown in FIG. 3g. The generator G1.1 produces a signal whose frequency is within the band *b*1, while the frequencies of the other generators are within the bands *b*2, *b*3, and *b*4. The frequencies *f*1...*f*4 are in each case determined within their band by the voltages applied to the generators by the capacitors C1.21...C1.24 and do not change for the entire duration of the sending out of a stack. By suitable selection of the delay times of the multivibrators MMV1.2, the length of the stack and the position of time thereof with respect to the input signal can be selected and desired, within certain limits.

Instead of the arrangement described having two storages connected in series for each frequency band of the signal stacks produced, there could also be selected a solution in which the two storages are arranged in parallel, in which case the pulses belonging to the successive groups are fed to them alternatively for accumulation.

Figure 2:
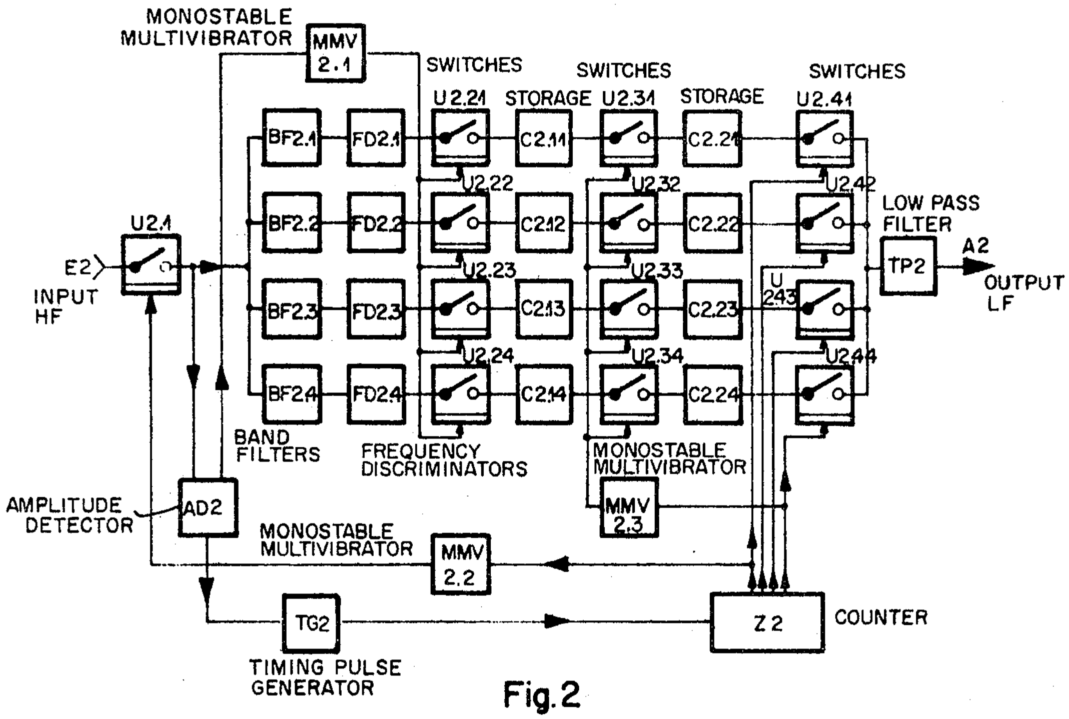
FIG. 2 shows a block diagram of a device belonging to the same system as FIG. 1 for the conversion of a signal produced by a device in accordance with FIG. 1 into a low-frequency signal.

The converting of the stacks according to FIG. 4*a*, which corresponds to FIG. 3*g*, back into a low-frequency signal can be effected by an arrangement in accordance with FIG. 2. This arrangement comprises an electronic switch U2.1 whose output leads to four band filters BF2.1...BF2.4 whose passbands agree with the frequency bands covered by the generators G1.1...G1.4.

Arranged behind each band filter is a frequency discriminator FD2.1...FD2.4 each having an output leading to switches U2.21...U2.24, respectively. The storages C2.11...C2.14, consisting of a capacitor, are connected to the outputs of said switches U2.21...U2.24. Further, switches U2.31...U2.34 connect these storages with further storages C2.21...C2.24 which are connected, via additional switches U2.41...U2.44, with the low-pass filter TP2 at the output A2 where the original low-frequency signal again appears. The various switches are controlled, on the one hand, by the pulse generator TG2 via the counter Z2 and, on the other hand, by the amplitude detector AD2, in each case one of the monostable multivibrators MMV2.1...MMV2.3 being connected in the path of the transmission in order to produce a delay in the controlling of the switches. The amplitude demodulator AD2 furthermore gives off pulses for the phase correction of the pulse generator TG2.

The manner of operation of the arrangement of FIG. 2 will now be described with reference to FIG. 4. The signal stacks shown in FIG. 4*a* are fed from the input E2 to the switch U2.1 which is closed in synchronism with the incoming stacks, in each case for the duration of one such stack. The cadence of the closing times is determined by the pulse generator TG2 which sends out pulses in synchronism with the sampling of the original signal (FIG. 3*b*). In the counter Z2, the frequency of the pulse generator is subdivided and each fourth pulse passes to the multivibrator MMV2.2 where it releases a pulse the length of which corresponds to the length of the stack received. The amplitude demodulator AD2, depending on the position in time of the stacks received, imparts synchronizing signals to the pulse generator TG2 so that the cadence produced thereby is continuously adapted to the signals received and the switch U2.1 is in all cases opened only when a stack arrives at the input E2. After a stack has passed through the switch U2.1, it is fed in parallel to the inputs of the band filters BF2.1...BF2.4 which filter out the frequencies contained in the stack and feed each to a frequency discriminator FD2.1...FD2.4. These discriminators transform each signal into a signal, the length of which fundamentally corresponds to that of the stack, the amplitude of which is invariable and which is dependent on the position of the frequency of the signal within its frequency band. The course of these signals at the outputs of the discriminators FD2.1 and FD2.4 is shown in FIG. 4*b1* and 4*b4*. These voltages produced by the discriminators are fed by the closing of the switches U2.21...U2.24 to the static storages C2.11...C2.14, each of which consists of a capacitor. The selection of the time of the closing of the switches and the production of the corresponding closing pulses, which are shown in FIG. 4*c4*, will be described later on. The course of the voltage at the storages C2.11 and C2.14 can be noted from FIGS. 4*d1* and 4*d4*.

Another series of storages C2.21...C2.24, which also consist of capacitors, are connected with the storages C2.11...C2.14 via the switches U2.31...U2.34. At a point of time lying between the reception of two signal stacks, the switches U2.31...U2.34 are simultaneously closed by pulses, which are shown in FIG. 4*e*, whereby the charges are equalized between the storages and thus the voltages stored in the storages C2.11...C2.14 are transferred into the storages C2.21...C2.24. In FIG. 4*f*, the course of the voltages at the two storages C2.21 and C2.24 is shown. It is clear that upon each closing of the switches U2.31...U2.34 for the equalization storages, the voltage in the first storage drops by a constant factor in accordance with the mutual size relationship of the capacitances. The storages C2.21...C2.24, whose voltages thus correspond to the position of the frequencies within the frequency bands assigned to them in the signal stacks at present at the input E2, are now discharged via the switches U2.41...U2.44 one after the other and the pulses produced thereby are fed in parallel to the low-pass filter TP2 which retains the disturbing frequencies caused by the sampling of the signal. The low-frequency signal which corresponds to the low-frequency signal fed into the arrangement of FIG. 1 at E1 then appears at the output A2.

The cadence at which the switches U2.41...U2.44 are opened is determined by the pulse generator TG2, the timing pulses shown in FIG. 4*g* being fed by the counter Z2 one after the other to the switches. The switches U2.31...U2.32 are closed at a time which lies between the closing times of the switches U2.41 and U2.44 which is effected by means of the multivibrator MMV2.3 which measures off a suitable period of time starting from the opening of the switch U2.44. Due to the use of two groups of storages, the closing of the switches U2.31...U2.34 and thus the filling of the storages C2.21...C2.24 takes place substantially before the closing of the switches U.2.41...U2.44 so that the rhythm of the conversion of the accumulated values into a continuous signal need not be necessarily tightly coupled with the times of the reception of the frequency stacks.

Figure 5:
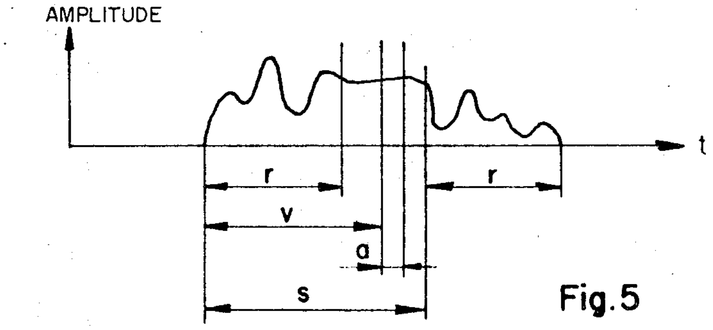
FIG. 5 represents the amplitude, at the place of reception, of a pulse sent out with constant amplitude and frequency between the transmitting and receiving stations after a multiway propagation takes place and when the largest difference in transmission time does not exceed the duration of the pulse sent out.

The showing of the variation with time of the signal stacks in accordance with FIG. 4*a*, and particularly of the output signals of the discriminators in accordance with FIG. 4*b*, applies only to ideal transmission, i.e. transmission over wires. Insofar, however, as a wireless transmission path with multipath propagation is present, the signal stacks received and therefore the individual signals differ from the shapes shown. The amplitude of a stack then, for instance, has the shape shown in FIG. 5. The two portions *r* correspond to the difference in transmission time between the directly received wave and the reflected wave having the longest transmission time. Between the starting up and dying away of the signal stack, the transmitted duration of which is designated by *s* in the figure, there is produced a steady state of the duration $s-r$ and the receiving device should take only this steady condition into consideration in order to exclude, as far as possible, disturbances in reception. This is obtained, in the arrangement shown in FIG. 2, in the manner that from the start of the reception of the signal in the case of each stack, a constant time *v* is measured off and after the expiration of this period of time, a short part of the duration *a* is cut out of the signal stack received. Thereupon only the values occurring during this time are fed to the further treatment. This is achieved by two cooperating monostable multivibrators jointly designated as MMV2.1. The first receives, in each case, a signal from the amplitude demodulator AD2 upon the commencement of the reception of a signal stack whereupon it produces a delay *v* after the end of which the second closes the switches U2.21...U2.24. for the time *a* so that, of the voltage at the discriminators, only the voltages occurring there at the time *a*, during which the amplitudes are invariable, are fed further to the storages C2.21...C2.24. The switch U2.1 is controlled indirectly by the pulse generator TG2 in the manner that by means of the counter Z2, in each case, the first pulse of a group is fed to the combination MMV2.2 consisting of monostable multivibrators, from where the switch U2.1 is closed for a period of time corresponding to the length of the stacks after a given time of delay, starting from the pulse, has expired. The pulse generator TG2 is synchronized via one of the outputs of the amplitude detector AD2 so that the pulses produced by it are at all times in a constant time relationship to the stacks received. Under this condition, it is possible to open the switch U2.1 in each case precisely upon the arrival of a signal stack.

Figure 8:
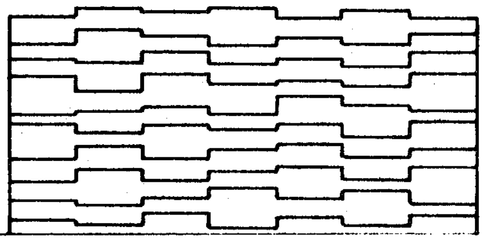
FIG. 8 shows a signal stack corresponding to FIG. 7 which, however, contains a substantially larger number of signal sections that in accordance with FIG. 7.

The system developed in accordance with FIGS. 1 and 2, which has been described, affords the possibility of selecting the length of the stacks larger than the distance apart of the sections produced by the sampling of the low-frequency signal. In this connection, for reasons of simplicity in description, the low-frequency signal was divided up only into four different frequency bands. The greater the number of frequency bands, the narrower the frequency stacks can be, as compared with the gaps, and a smaller channel occupation with regard to the time can be achieved. Since the number of frequencies sent out simultaneously is limited in practice, it is possible, in order to mitigate the disadvantages resulting therefrom, to produce stacks each of which contain, for each frequency band, instead of a single section corresponding to an individual section of the low-frequency band, a plurality of such sections which adjoin each other without any gap in time. For example, a stack, such as shown in FIG. 8, may contain 10 frequency bands with seven consecutive sections in each frequency band so that a total of 70 sections can be handled. As a result of the use of such a long stack, the lengthening of the stacks caused at the place of reception by the multiway propagation is of less importance as compared with the production of seven stacks also having 10 frequency bands but only one section per frequency band. This is due to the fact that this lengthening has an absolute value per stack whereby the lengthening referred to the stack length decreases with an increase in the length of the stack. This lengthening has no effect on the reproduction of the low-frequency signal as long as the individual sections have been made sufficiently long in accordance with the concepts explained in detail above and insofar as only the transmission between the transmitting station and the receiving station is concerned. However, this lengthening appears in a disturbing fashion when several of such systems are operated simultaneously in a nonsynchronous time multiplex system. Under this condition the lengthening of the stacks caused by the reflections leads, due to the longer period of occupation of the channel caused thereby, to an increase in the noise, the amount of which depends on the relative widening of the stacks and thus on the relative curtailing of the gaps between the stacks so that more favorable results can be obtained with longer stacks.

Figure 6:
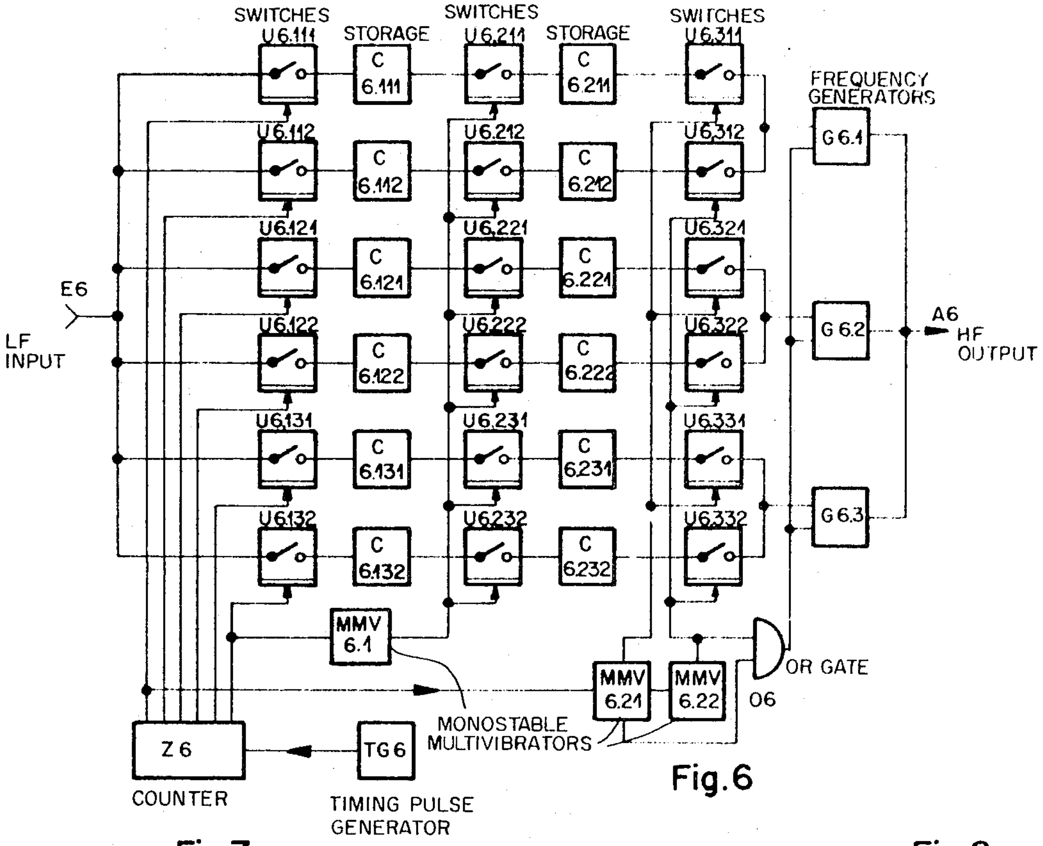
FIG. 6 shows the block diagram of a variant of a device in accordance with FIG. 1.
Figure 7:
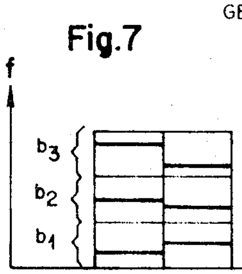
FIG. 7 shows the frequency-time diagram of a signal stack which is produced by means of the device in accordance with FIG. 6.

FIG. 6 shows the block diagram of an arrangement with which for instance such stacks can be produced. For the sake of simplicity the figure has been limited to the production of a stack, the sections of which lie in only three different frequency bands, each having two sections. Such a stack thus consists of two partial stacks and is shown in FIG. 7. The parts shown in FIG. 6 which agree in function with the parts shown in FIG. 1 have been designed in a manner similar to FIG. 1. For each of the switches U1.11...U1.13 there are two corresponding switches U6.111 and U6.112, U6.121, and U6.122 etc. The same is true in connection with the storage C1.11...C1.13 for which there are corresponding storages C6.111...C6.132 while C6.211...C6.232 correspond to the storages C1.21...C1.23, and the generators G6.1...G6.3 correspond to the generators G1.1...G1.3. The circuit elements TG6, Z6 and MMV6.1 of FIG. 6 correspond to TG1, Z1 and MMV1.1 of FIG. 1. The function of these indicated switch elements will therefore not be explained further. Every two switches and corresponding storages are associated with one frequency band represented in the stack. The stored values of such a pair of storages are sent out one after the other.

As compared with FIG. 1, the new and additional components are the electronic switches U6.311...U6.332 which are arranged between the storages C6.211...C6.232 and the generators G6.1...G6.3. The place of the multivibrator MMV1.2 is now taken by two multivibrators, namely MMV6.21 and MMV6.22. The output signal of the one closes the switches U6.31...U6.33 having the final digit 1 and the output signal of the other closes those having the final digit 2. The two multivibrators each produce a pulse of the duration of an emitted partial stack, these two pulses adjoining each other without any gap. In contradistinction to the arrangement in accordance with FIG. 1, in this case the voltages of every two storages are imparted one after the other to the same generator so that there are produced in succession two partial stacks, each of which comprises three frequencies lying in three frequency bands. The generators G6.1...G6.3 are connected via the OR-gate 06 so that they are put in operation during the entire time during which the one group of switches U6.311...U6.332 is closed. During the connection of the generators therefore, first of all the voltages lying on the storages C6.211...C6.231 are applied to the generators while in the second phase, which immediately follows this first phase, this is true of the values stored with the storages C6.212...C6.232. By suitable selection of the time constants of the multivibrators MMV6.21 and MMV6.22, the length of the stacks and their position in time with respect to the input signal 1 can be selected as desired within certain limits.

A receiving system for the converting of the signal stacks in accordance with FIG. 7 into a low-frequency signal is not described, but the manner of the construction thereof can be concluded without difficulty on basis of the arrangements described up to now.

Figure 9:
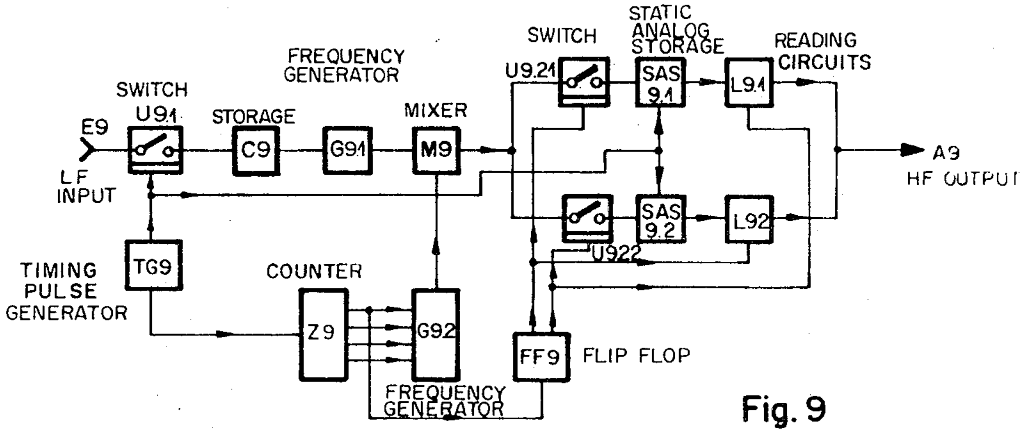
FIG. 9 shows the block diagram of a device for converting a continuous low-frequency signal into the same signal stacks as the device in accordance with FIG. 1, this result, however, being obtained in a fundamentally different manner.

The arrangement, whose block diagram is shown in FIG. 9, produces the same type of signal stacks as that shown in FIG. 1, but in very different manner. In this case also the individual amplitude values of the low-frequency input signal are converted into signal sections which lie within different frequency bands and each of which has a constant amplitude and frequency. The frequency within the frequency bands depends on the amplitude of the corresponding instantaneous value of the low-frequency signal. In this case also the signals are given off in stacks in the manner that the signal sections lying in the different frequency bands are sent out simultaneously.

As can be noted from FIG. 9, the low-frequency input signal passes from E9 to an electronic switch U9.1 and from there to storage C9 consisting of a capacitor. The voltage present on the storage controls the frequency of a generator G9.1 whose output signal arrives at a modulator M9 and is there mixed with a signal supplied by the generator G9.2. A pulse generator TG9 controls the switch U9.1 on the one hand and the counter Z9 on the other hand. This counter feeds the timing signal alternately to different inputs of the generator G9.2 which, depending on these signals, gives off four different frequencies. The counter Z9 furthermore controls the bistable multivibrator FF9 which closes one of the two switches U9.21 or U9.22 depending on its position. The signals given off by the mixer stage M9 then pass alternately to one of the two static analog storages SAS9.1 or SAS9.2. These two storages have the property that further analog information can be entered additively on the information contained in them. Since the information must be stored in the form of high frequencies, the necessary storage capacity is very high. Such a storage can be formed for instance by means of a cathode-ray tube which charges and discharges capacitors arranged in the form of a divided plate. The two reading devices L9.1 and L9.2, the reading process of which is controlled by the multivibrator FF9, alternately read out the values contained in the two storages and conduct them to the output A9.

In FIGS. 3*a* and *b* and 10 there is shown the waveforms of the signals in the various stages of the device of FIG. 9, in which connection it should be noted that the time scale is not the same in the two cases. As in the device in accordance with FIG. 1, pulses whose amplitude depends on the instantaneous value of the low-frequency signal are formed at regular intervals measured by the timing-pulse generator TG9 from the low-frequency signal which is fed at E9. For this purpose, the timing-pulse generator TG9 in each case closes the switch U9.1 for a short period of time. The pulse amplitude modulated signal produced thereby is shown at FIG. 3*b*. This signal is fed to the storage C9 where a constant voltage is present, between two pulses as shown by FIG. 10*a*. The frequency of the generator G9.1 which continuously gives off a signal is controlled by the voltage present on the storage C9 so that it also gives off a signal in accordance with FIG. 10*a* when the frequency is considered as the ordinate in place of the amplitude. The frequency scale in this connection does not agree with that of FIGS. 10*b*...*d*. The frequency of the generator G9.2 is controlled by the counter Z9 at one of the four predetermined values. It alternately applies a potential to the four control inputs of the generator. The generator accordingly gives off a signal, the amplitude of which is constant, while its frequency extends along a continuous four-step step-shaped curve, not shown in the drawing. Instead of an individual generator, several generators connected alternately could of course also be provided, each of which would send out only a single frequency. The duration of a frequency train given off by the generator G9.2 corresponds to the duration of a group comprising four signal sections of the low-frequency signal. In the modulator M9, the signals coming from the generators G9.1 and G9.2 are mixed to produce the step-shaped curve shown in FIG. 10*b*, with each step representing a frequency located in a different frequency band and dependent within the frequency band on the amplitude of the corresponding section of the input signal. The frequencies of the signals of the two generators G9.1 and G9.2 and thus also the mixed products produced by the modulator M9 are greater by a factor of *n* than those in the signal stacks obtained at the output A9. This factor *n* will be explained later.

These signals produced by the modulator M9 are fed through one of the two switches U9.21 or U9.22 to the two static analog storages SAS9.1 and SAS9.2. These two storages are connected to the timing-pulse generator TG9 which effects the storage thereof in synchronism with the sampling of the low-frequency signal in the manner that in each case a signal section which corresponds to a section of the low-frequency signal (sections in accordance with FIG. 10*a*) and has a given constant frequency fills the storage with respect to storage time, whereupon the next section which is of the same nature as the first but has a frequency lying in a different frequency band is again entered at the same place as the first section. By this additive storage, a signal stack is thus stored in the storage in question. FIG. 10*c* shows such signal stacks, in which connection the manner in which they are produced can also be noted. The length of time of these stacks is referred to the time of the storing of the signal sections. Under these conditions, the frequencies also correspond to the frequencies entered and are thus higher by the aforementioned factor of *n* than the frequencies given off at the output A9. The alternation in the filling of the two storages is controlled by the bistable multivibrator FF9 which is flopped, in each case, upon passage from one group of the pulses produced with the switch U9.1 to the next by a pulse of the counter Z9 and correspondingly influences the switches U9.21 and U9.22.

While signals are now stored in one storage, the stored signal stack in the other storage, controlled by the two reading circuits L9.1 and L9.2, is read out with a speed which is reduced to one $n^{th}$ of the speed of storing. The two reading circuits are triggered by the bistable multivibrator FF9. Upon this slow removal from storage, the stack is lengthened, as shown in FIG. 10*d*, by *n* times the amount, while the frequencies are reduced to one $n^{th}$. These stacks shown in FIG. 10*d* correspond to those of FIG. 3*g*.

Figure 10:
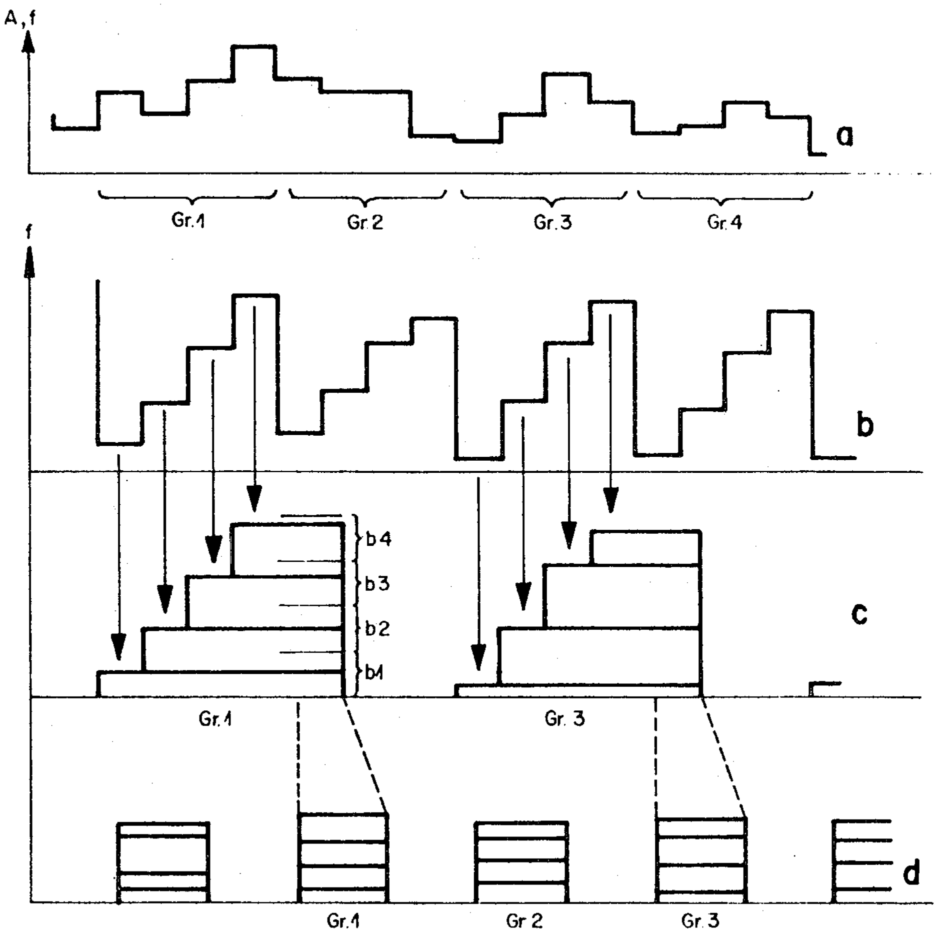
FIGS. 10a and 10d show amplitude and frequency-time diagrams of signals which occur within and at the output of the device according to FIG. 9.

In the manner described above in connection with FIGS. 9 and 10, it is of course also possible to produce not only the stacks in accordance with FIGS. 3*g*, 4*a*, and 10*d*, but also stacks in accordance with FIGS. 7 and 8, in which case the devices necessary for this purpose should be readily apparent on the basis of the embodiments already described and therefore need not be described here. This is also true with respect to a device for the transforming of the signal stacks back into low-frequency signals. For this purpose it is possible to use an arrangement which works in a manner analogous to that shown in FIG. 9. In this case the signals are stored slowly in the storage and read out rapidly. Either the storage content, insofar as the storage process is suitable for this, can be read out several times and the signal which has been read out fed each time over a different filter, or else the stored values can be read out only once and fed simultaneously to different filters, whereupon, they must be stored a second time in order that they can be used in succession to form the low-frequency signal.

Figures 11, 12:
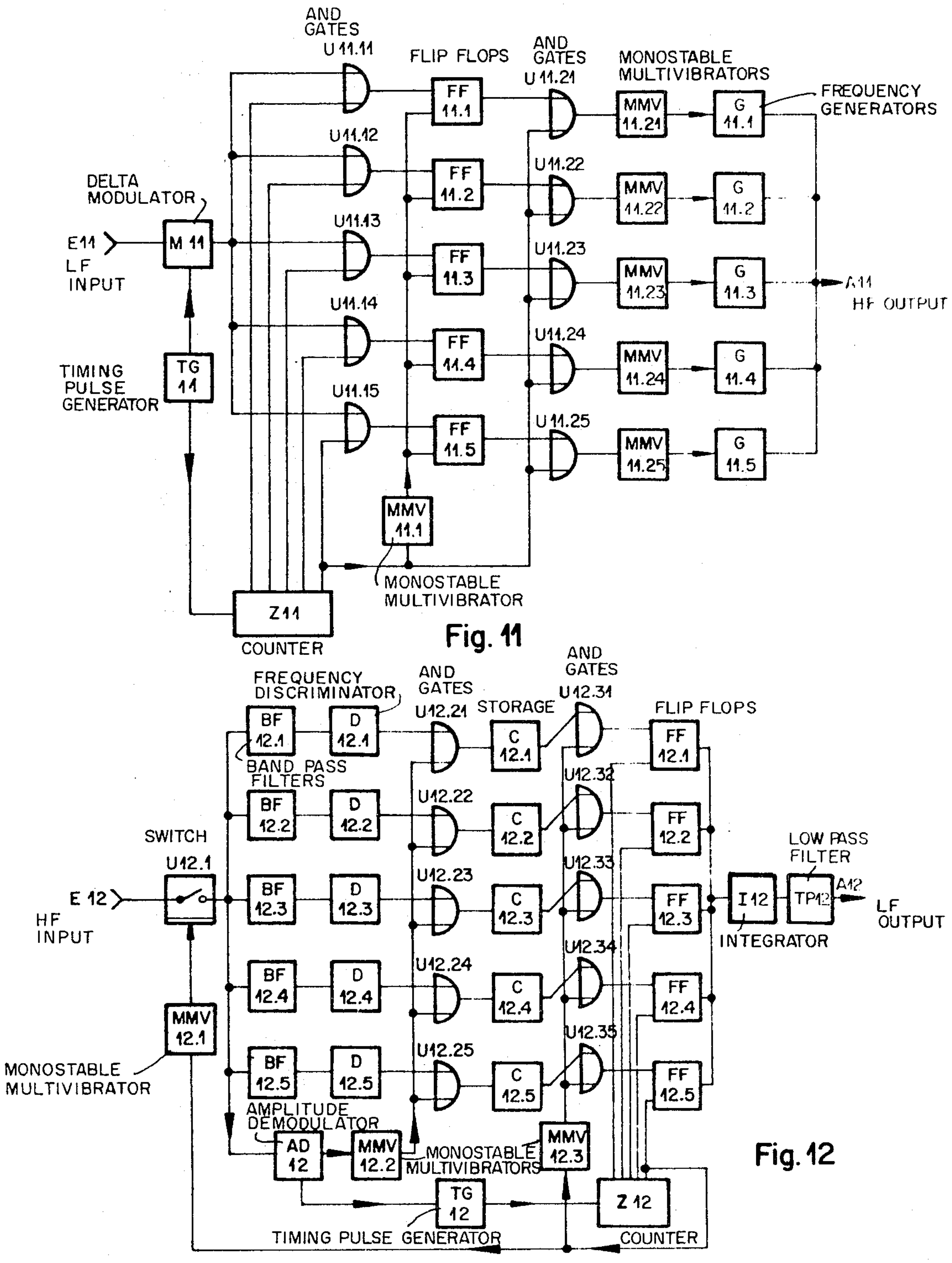
FIG. 11 shows the block diagram of a device for transforming a continuous low-frequency signal into signal stacks, the transformation taking place by means of the delta modulation.
FIG. 12 shows a block diagram of a device for transforming the signal stack produced by a device in accordance with FIG. 11 into a low-frequency signal.

FIG. 11 shows the block diagram of a device for producing signal stacks in which the message content is contained in the form of delta modulation, and FIG. 12 shows the block diagram of such a reconversion arrangement. As is generally known, for the dividing of the low-frequency signals into sections, in the case of delta modulation, these sections must be considerably shorter than in the case of other types of pulse modulation. Assuming the same distances between the stacks produced as in the systems previously described, the stacks must, in the case of delta modulation, therefore, have considerably more sections corresponding to the subdividing of the low-frequency signal than in the case of the pulse amplitude modulation which was taken as basis for the earlier described systems. In order for the figures to be clear, in the example described below, only five sections in each case of the low-frequency signal will be combined in a signal stack, even though considerably larger stacks must be employed for practical use.

The arrangement in accordance with FIG. 11 consists of a timing-pulse generator TG11, a delta modulator M11 and a counter Z11 which is controlled by the timing-pulse generator and the output signals of which open the AND-gates U11.11...U11.15 one after the other. The outputs of these gates are fed to the bistable multivibrators FF11.1...FF11.5 which can be brought into their rest position by the counter Z11 via the monostable multivibrator MMV11.1. Further monostable multivibrators MMV11.21...MMV11.25 are controlled by the bistable multivibrators FF11.1...FF11.5 via the AND-gates U11.21...U11.25 and cause the generators G11.1...G11.5 to put out a signal. An incoming continuous low-frequency signal passes through the delta modulator M11 which is controlled by the timing-pulse generator TG11 and where, in a known manner, there is produced a pulse signal the pulses of which have a constant amplitude and are a distance apart which is an integral multiple of a basic time. Expressed differently, there are pulse places formed by a given cadence and having the same distance apart in time, on which places a pulse may or may not appear. Such pulse places are arranged in the present system in groups of five and within its group each pulse has a fixed place, as shown in FIG. 13*a*. The pulses now pass from the modulator in parallel to the gates U11.11...U11.15, the outputs of which lead to the bistable multivibrators FF11.1...FF11.5 which are opened in succession, as in the arrangement shown in FIG. 1.

For each multivibrator there is a corresponding given pulse place within the groups and after the completion of the giving off of a group of pulses, by the modulator M11, the positions of the multivibrators FF11.1...FF11.5 (assuming that in each case they are in a position of rest before the arrival of the first pulse of a group) indicate the position of the pulses which were present within this group. This can be noted from FIG. 13*b*1...13*b*5 where each of these figures shows the variation with time of the position of one of the multivibrators FF11.1...FF11.5. Between the giving off of two groups of pulses by the modulator M11 all multivibrators FF11.1...FF11.5 are again brought back into their position of rest in the manner that a pulse shown in FIG. 13*c* is given off by the counter Z11 and after a delay time produced by the monostable multivibrator MMV11.1 is fed to the bistable multivibrators.

With the last pulse time of a group, the AND-gates U11.21...U11.25 are opened for a short time. Those of the bistable multivibrators FF11.1...FF11.5 which are in the operating position can accordingly influence the monostable multivibrators MMV11.21...MMV11.25 associated with them. Each of these influenced multivibrators now gives off, simultaneously with the others, a signal of a given duration to the generator associated with it (G11.1...G11.5) which in its turn is placed in operation during this time. All generators together then produce a signal stack such as shown in FIG. 13*d*. The duration of the placing in operation of the generators is in this connection longer than the interval of time between the impulse places. The signal stacks in accordance with FIG. 13*d* contain only those five different frequencies for which a corresponding pulse was present in the pulse produced previously by the modulator M11.

With an arrangement in which two generators would be provided for each of the multivibrators FF11.1...FF11.5 or having five generators each of which could send out two fixed frequencies each lying within a frequency band, there could be produced signal stacks each of which contains five frequencies. In this case, the information, i.e. the fact whether a given pulse is or is not contained in the delta-modulated signal, would be contained in the position of the frequency of each section within a frequency band. An arrangement operating in accordance with the principle described above could also, by increase of the storage means, be constructed in such a manner that signal stacks composed of several successive individual stacks, as shown in FIGS. 7 and 8, would be produced. Instead of the multivibrators FF11.1...FF11.5 other storage devices, for instance capacitors, could also be used and for the rest of the construction, arrangements similar to that shown in FIG. 1 would have been possible.

Figure 13:
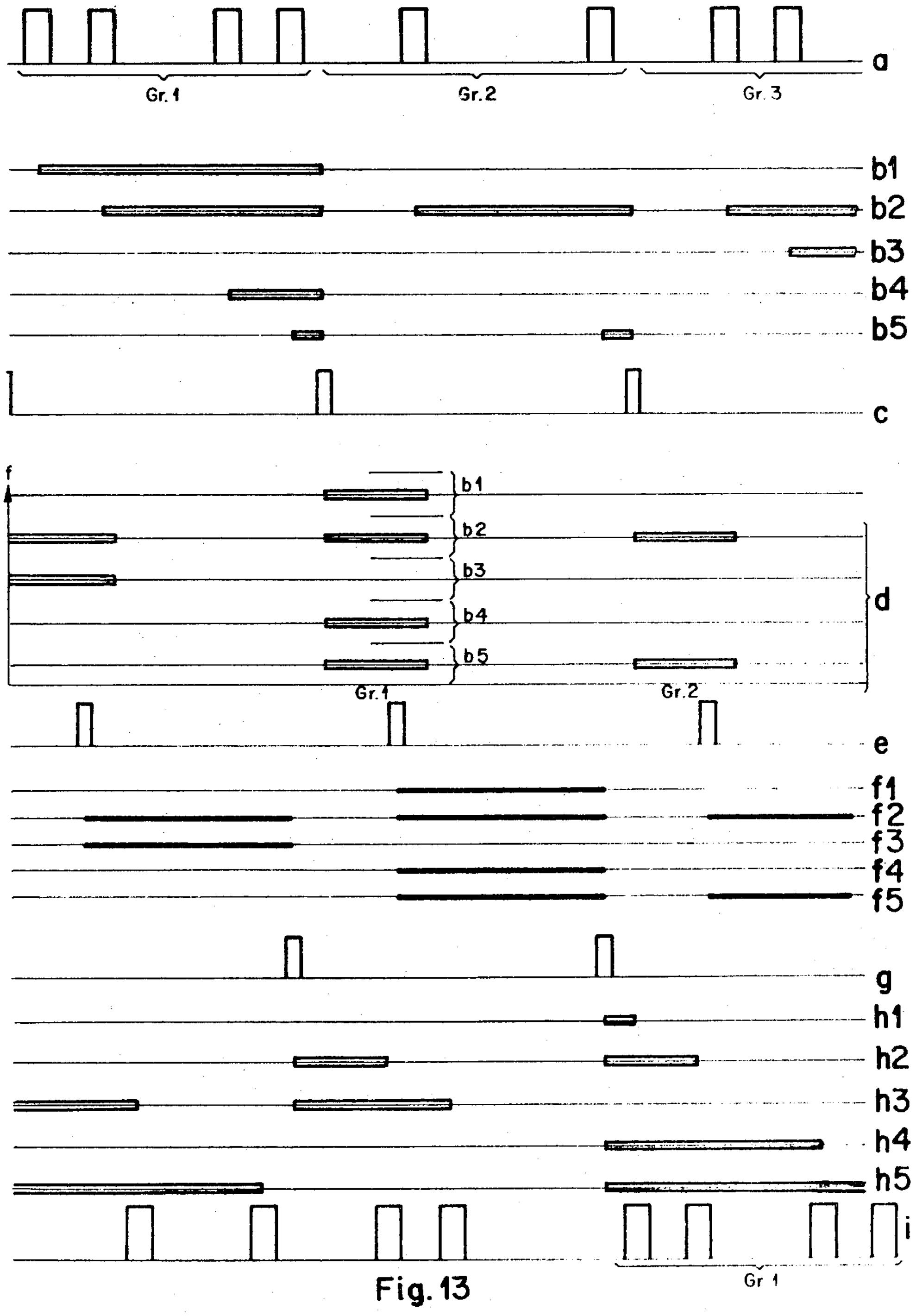
FIGS. 13a to 13i show amplitude and frequency-time diagrams for the signals occurring in the devices in accordance with FIGS. 11 and 12.

In the reconversion device shown in FIG. 12 for converting the signal stacks in accordance with FIG. 13 into a low-frequency signal, the input signal passes from the input E12 via the electronic switch U12.1 to five band filters BF12.1...BF12.5 from where it is fed to the amplitude demodulators D12.1...D12.5, to the AND-gates U12.21...U12.25 and to one of the storages C12.1...C12.5. These storages are in their turn connected via the gates U12.31...U12.35 with the bistable multivibrators FF12.1...FF12.5. The outputs of these multivibrators extend in parallel to an integrator I12 and the integrator is connected via a low-pass filter TP12 with the output A12. Corresponding to the arrangement in FIG. 2, a time-pulse generator TG12, a counter Z12 and an amplitude detector AD12 are present, the functions of which correspond precisely to earlier described embodiments and therefore need not be described here a second time. The function of the monostable multivibrators MMV12.1, MMV12.2 and MMV12.3 will be taken up in detail during the course of the description of the operation.

As already described with respect to FIG. 2, the input signal in this case also passes via the switch U12.1 which is closed upon reception of each signal stack in parallel to the filters BF12.1...BF12.5 where the frequencies contained in the individual stacks are filtered out and fed to the demodulators D12.1...D12.5. Upon the reception of each signal stack, depending on the frequencies contained in the stack in question, a signal occurs at the output of one of these discriminators while no corresponding signal is present at the output of the others.

The amplitude demodulator AD12, as in the arrangement in accordance with FIG. 2, gives a signal to the timing-pulse generator TG12 which is synchronized with this signal. Another signal passes to the monostable multivibrator MMV12.2 which at a very specific time, measured from the front flank of the stack with a constant time spacing, opens the gates U12.21...U12.25. These signals which open the gates are shown in FIG. 13*e*. As already stated, there is selected in this connection a point of time when the input signals are in a steady state. The signals given off by the discriminators D12.1...D12.5 are fed via the gates to the static storages C12.1...C12.5 so that the entire pulse picture contained in a stack is stored in said storages. In FIG. 13*f* the course of the state of the corresponding storage as a function of time is shown.

At a time lying between the reception of two stacks, a pulse is produced in each case by the multivibrator MMV12.3, it having derived this pulse from a pulse obtained from the counter Z12. These pulses, which are shown in FIG. 13*g*, open the AND-gates U12.31...U12.35 so that the voltages stored in the storages C12.1...C12.5 can act on the bistable multivibrators FF12.1...FF12.5. Thereupon, by each of the storages having a voltage, the multivibrator associated with it is flipped from the rest position into the operating position. Their condition is shown in FIG. 13*h*1...13*h*5. By the counter Z12 controlled by the time pulse generator TG12, there is now applied to the individual multivibrators, one after the other, such a voltage that those which are in the operating position flop back. As can easily be seen there is produced, on the parallel-connected outputs of the multivibrators, a normal delta-modulated signal, such as shown in FIG. 13*i* and corresponds to the signal according to FIG. 13*a*. This signal is transformed in the integrator I12 into a continuous low-frequency signal from which the noise frequencies caused by the sampling are filtered out by the low-pass TP12.

If signal stacks, in which there are present separate signal sections for the pulses and for the gaps of the delta-modulated signals, are to be treated, then instead of one band filter and amplitude discriminator two frequency discriminators each would have to be provided and the number of storages and of gates doubled. The description of further details will be dispensed with here since such a system would be constructed in a manner similar to that described previously.

Figure 14:
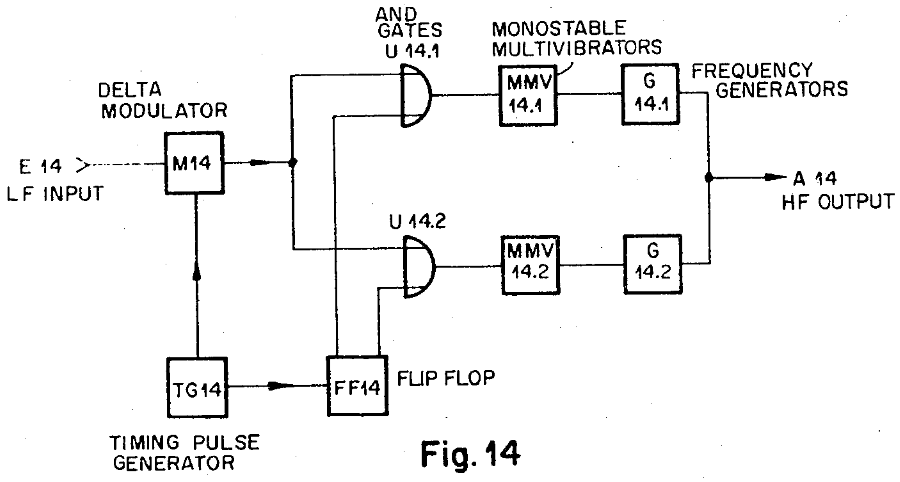
FIG. 14 shows the block diagram of a device for transforming a continuous low-frequency signal into two high-frequency signals, in which the signal sections are longer than those obtained by the subdividing of the low-frequency signals.

FIG. 14 shows a block diagram of a device for producing a signal consisting of several frequencies and which is better suited for transmission over paths with multiwave propagation than is a normal continuous high-frequency signal of a single frequency modulated with a low-frequency signal. The improvement is possible since here the second output signal can be divided into signal sections which are longer than the longest sections into which the low-frequency signal can be divided. In the arrangement in accordance with FIG. 14, a low-frequency signal is converted into a signal consisting of two parts each lying in separate frequency bands. This arrangement contains a delta modulator M14 and a timing-pulse generator TG14 which provides both this modulator and a bistable multivibrator FF14 with pulse signals. The signal produced by the delta modulator passes via the two AND-gates U14.1 and U14.2 to the two monostable multivibrators MMV14.1 and MMV14.2 to which the two generators G14.1 and G14.2 are connected.

Figure 15:
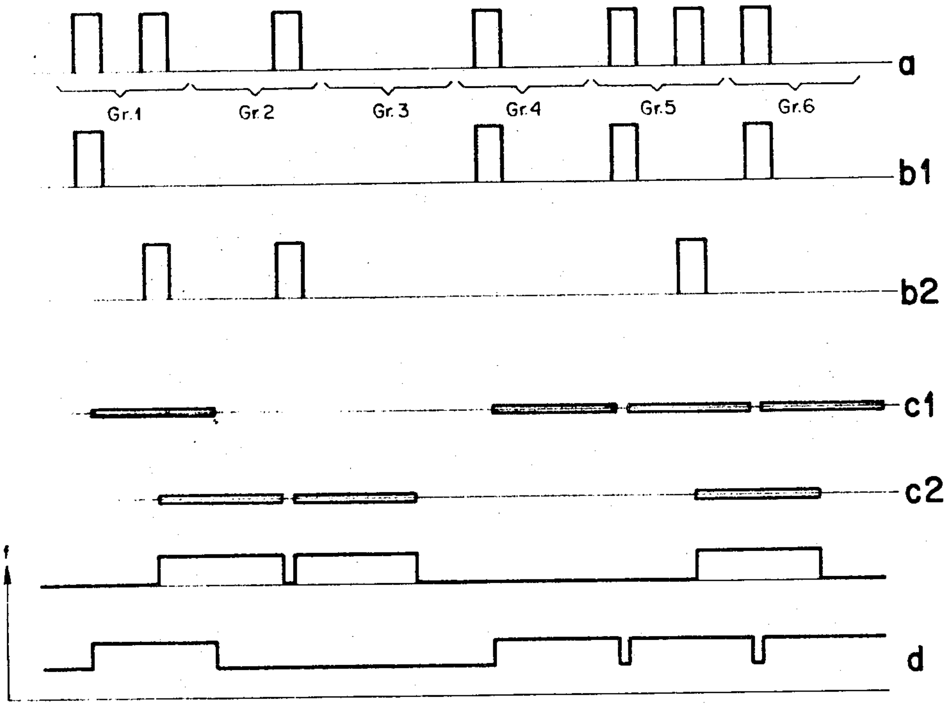
FIGS. 15a to 15d show amplitude and frequency-time diagrams for the signals occurring in the device in accordance with FIG. 14.

From FIG. 15 is can be seen how the signals are transformed in an arrangement in accordance with FIG. 14. FIG. 15*a* shows a signal which was produced by the delta modulator M14 from the low-frequency signal. The two gates U14.1 and U14.2 are opened alternately by the multivibrator FF14, an alternation being effected upon each time of sampling. Each two pulses in this connection form a group, as is correspondingly designated in FIG. 15*a*. The pulses occurring at the outputs of the two gates are shown in FIGS. 15*b*1 and 15*b*2. These signals are fed to the two multivibrators MMV14.1 and MMV14.2. The delay time of these two monostable multivibrators is so adjusted that it corresponds to twice the interval of time between two pulses produced by the timing-pulse generator TG14. FIGS. 15*c*1 and 15*c*2 show the signals which are produced by the multivibrator MMV14.1 and MMV14.2 on basis of the signals fed to them in accordance with FIG. 15*b*.

The two generators G14.1 and G14.2 each continuously give off one of two frequencies, each of which lies within the same frequency band, the frequency given off being in each case dependent on whether the corresponding multivibrator gives off a signal or not. The signals produced by these generators are shown in FIG. 15*d* as frequency-time diagrams. Their frequency is in each case unchanged at least for a period of time which corresponds to twice the interval in time between the timing pulses which control the modulation. By this measure, in the case of wireless transmission with differences in transmission time and assuming a suitable receiving device, the information transmitted is impaired much less by disturbances than a transmission with shorter sections. It is clear that the frequency bands contained in the output signal could be further increased, in which connection it would be possible to correspondingly lengthen the sections of constant frequency which subdivide the frequency bands in time.

Figure 16:
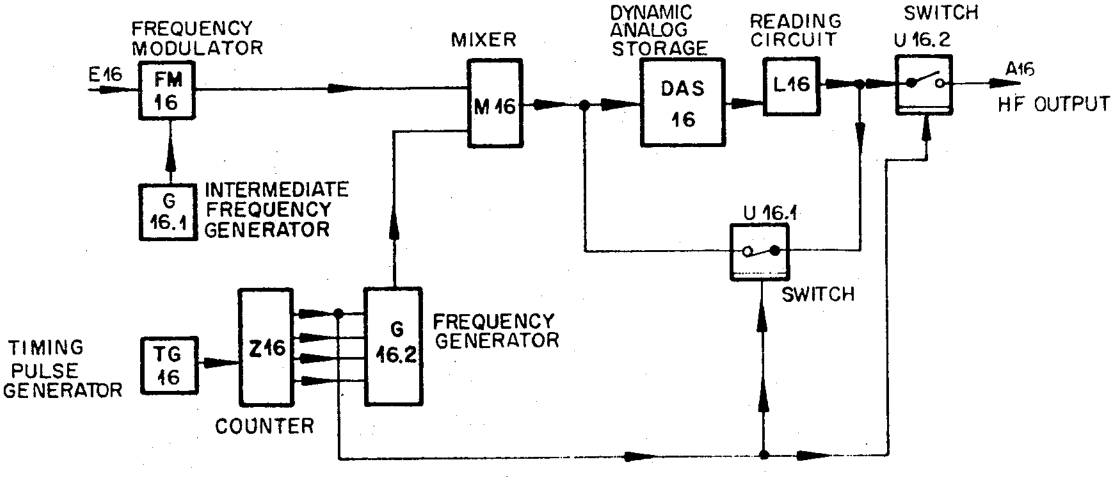
FIG. 16 shows the block diagram of a device for transforming a continuous low-frequency signal into signal stacks, in which the input signal is subdivided into relatively long sections.

In FIG. 16 there is shown the block diagram of a system in which, while the signal sections at the output are not lengthened as compared with those at the output, nevertheless they are displaced in time in such a manner that they are given off as parts of stacks. The system can thus be operated together with others in a time multiplex system, in which connection relatively large time intervals between the individual stacks are possible, which has a favorable influence on the noise level in case of transmission paths which suffer from reflection, as already stated. In FIG. 16 there is shown a modulator FM 16 which modulates the low-frequency signal fed to it onto an intermediate frequency produced by the generator G16.1. There is furthermore present a timing-pulse generator TG16 whose output pulses are fed to the counter Z16. The outputs of this counter which are lead one after the other on a voltage are connected with the carrier generator G16.2. The signal produced by this generator is fed to a mixer stage M16 together with the signal coming from the output of the frequency modulator. The output signal from the mixer stage is fed to a dynamic analog storage DAS16. These signals pass through the analog storage in a given time and appear in unmodified form again at the output.

The electronic or electromagnetic switch U16.1, which is normally closed in a position of rest, connects the output of the storage with its input, which connection thus can be interrupted by a control signal applied to the switch. The reading circuit L16 reads the information contained in the storage DAS16 and feeds it to the two switches U16.1 and U16.2.

Figure 18:
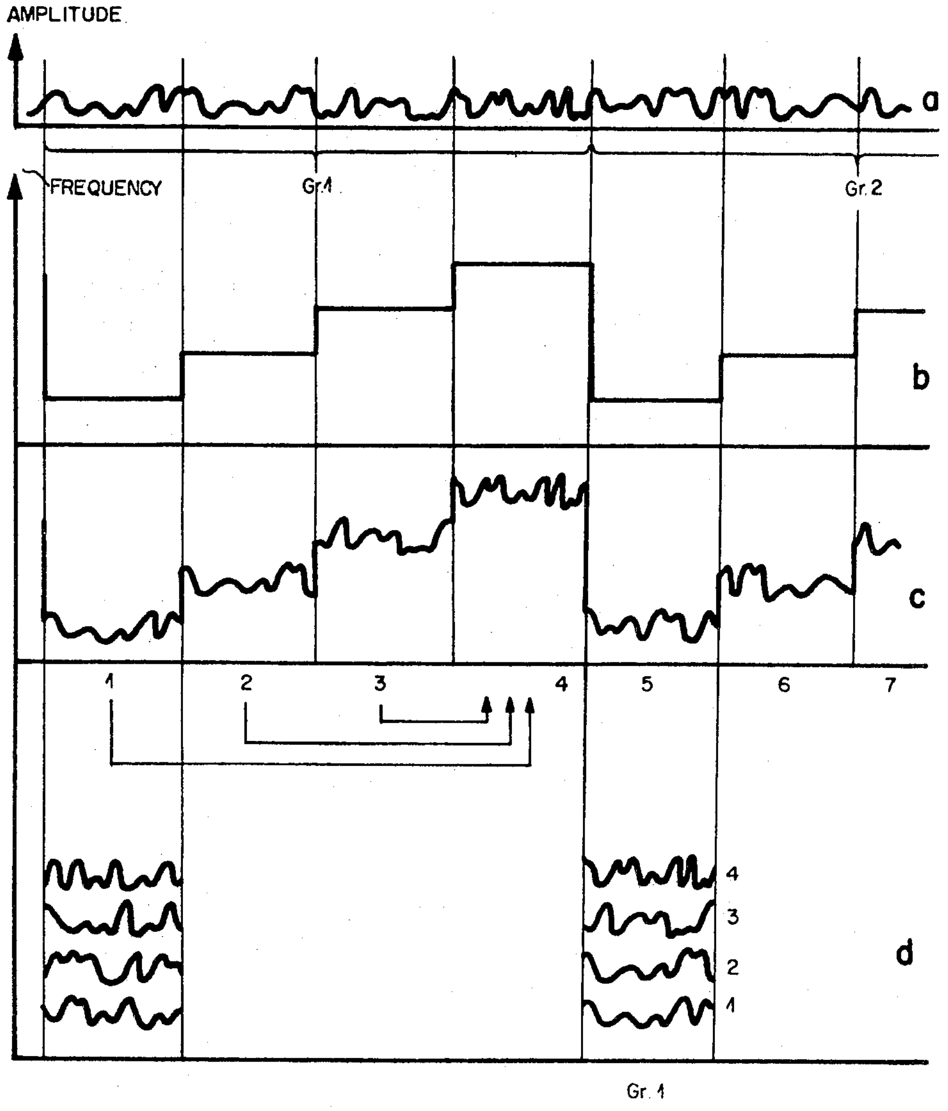
FIGS. 18a to 18d show the amplitude and frequency-time diagram for the signals occurring in the device in accordance with FIG. 16.

In the frequency modulator FM16, the input low-frequency signal, shown in FIG. 18*a*, is modulated on a carrier produced by the generator G16.1. The signal produced thereby corresponds again to FIG. 18*a*, provided that the frequency is selected as the ordinate. The generator G16.2 continuously produces a signal whose frequency, as shown in FIG. 18*b*, has a step-shaped waveform, the frequency given off being determined by the counter Z16 by application of a potential to a given input of the generator. The length of the sections of the individual frequencies is determined by the timing-pulse generator TG16 and by far exceeds in this connection the period of the highest frequencies present in the low-frequency signal. The mixing produces the signal of step-shaped frequency shown in FIG. 18*c*, in which connection the individual sections are frequency modulated with the sections of the original low-frequency signal. Therefore, a complete step corresponds to a group consisting of four sections of the low-frequency signal.

These signals are now fed one after the other to the input of the storage DAS16. The storage is dimensioned in such a manner that the transmission time of the signals corresponds precisely to one section (i.e., one step) of the signal so that immediately after the storing of the end of one section, the start of the same section appears at the output of the storage. The signals put into storage at its input are given off at its output after a time delay given by the duration of one section. The signals which leave the storage are taken over by the reading circuit L16, conducted over the switch U16.1 and stored again together with the signal coming from the modulator M16, the two signals being additively stored jointly. After the time corresponding to one section has passed, one more section is stored, whereby a signal stack is formed which is enlarged until all sections belonging to a group are present in the storage. This formation of a stack is indicated by the arrows in FIG. 18*c*. A (complete) signal stack corresponding to an entire group of sections is contained in the storage when the end of the fourth section of a group has been stored and the generator C16.2 is switched from the highest frequency to the lowest. At this time, a control voltage is given by the counter Z16 to the switches U16.1 and U16.2, so that as a result of the opening of the former and the closing of the latter a stack shown in FIG. 18*d* is now fed from the reading circuit L16 to the output A16, while the first section of the next group is stored at the input of the storage.

It is clear that the type of stack last described can also be produced in ways other than that shown. The arrangement described presupposes a storage in which recording and reading can be effected simultaneously. When using static storages in which these processes cannot take place simultaneously, it would be necessary to provide two storages which must be alternately filled and emptied. Since no fundamental differences result as compared with FIG. 16, a more detailed description of these circuits is not necessary. Other variants for the production of the signal stacks in accordance with FIG. 18*d* are also conceivable. Thus, for instance, instead of a generator operating on different frequencies, and a mixer stage, modulators could be provided for each section of a group. Instead of frequency modulation, single-sideband modulation can also be employed.

Figure 17:
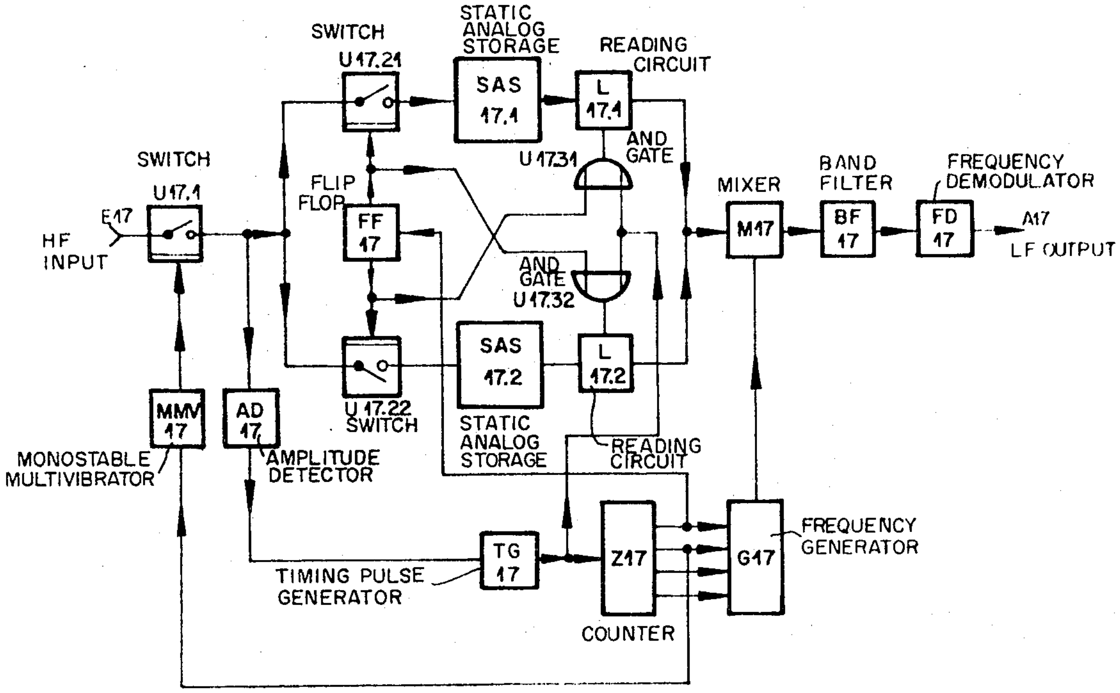
FIG. 17 shows the block diagram of a device which converts the signal stacks produced by a device according to FIG. 16 back again into a continuous low-frequency signal.

The converting of the signal stacks in accordance with FIG. 18*d* back into low-frequency signals can be effected, for instance, with an arrangement according to FIG. 17. Corresponding to the arrangements of FIGS. 2 and 12, the input E17 leads to a switch U17.1 which is closed by the counter Z17 by means of the monostable multivibrator MMV17 each time for the duration of the arrival of a stack. The counter Z17 in this case also is stepped forward by the timing-pulse generator TG17 which in its turn is synchronized by the output signal of the amplitude detector AD17. The bistable multivibrator FF17 either alternately closes the switch U17.21 and opens the gate U17.32 or closes the switch U17.22 and opens the gate U17.31. The outputs of the switches U17.21 and U17.22 each lead to a static analog storage SAS17.1 and SAS17.2. A cathode-ray tube can be used as such a storage, as already mentioned in connection with FIG. 9. With each of these storages there is associated a separate reading circuit L17.1 and L17.2. By the two gates U17.31 and U17.32, which are also controlled by the multivibrator FF17, the reading commands given off by the timing-pulse generator TG17 are alternately conducted to the two reading circuits L17.1 and L17.2. A generator G17, controlled by the counter Z17 gives off signals having a step-shaped frequency course, as has been described with reference to the generator G16.2. In a mixer stage M17, the signal produced by the generator G17 is mixed with the signal given off by one of the reading circuits and fed to the band filter BF17 and finally to the frequency demodulator FD17.

An incoming signal stack passes, as described in connection with FIGS. 2 and 12, via the switch U17.1 and one of the switches U17.21 or U17.22, to one of the static analog storages SAS17.1 or SAS17.2, where it is stored. In contradistinction to the examples previously mentioned, in which only one or several sections of a received signal stack were used further, in this case the entire stack is stored in its presumed length. The bistable multivibrator FF17 which actuates the gates U17.31 and U17.32 in correspondence to the switches U17.21 and U17.22 is flopped at a time which is at a constant interval from the time of the arrival of the stacks so that at all times recording is possible at one of the storages and reading at the other. The reading circuit whose corresponding gate is opened receives pulses at regular intervals from the timing-pulse generator TG17, namely four pulses per stack received, corresponding to the four sections contained in each of the stacks received. In dependence on these pulses, the storage content, without being destroyed, is read each pulse time and fed to the mixer stage M17. During each reading of information corresponding to a stack, the generator G17 produces another frequency which is so selected that another one of the frequencies contained in the stack together with the generator frequency gives a mixed product the frequency of which corresponds to the pass frequency of the band filter BF17. In the frequency demodulator FD17, the low-frequency signal is recovered and fed to the output A17.

The invention is, of course, not limited to the examples indicated and in particular not to the arrangements described for the transforming of the signals. It lies within the skill of the man skilled in the art to solve in other manners the tasks solved in the examples given by the use of the switching means described in other combinations. The small number of sections of which the signal stacks consist, which has been assumed in the examples in which the production of signal stacks is described, was selected merely for reasons for simplicity of description, since in order to obtain the advantages mentioned in the preamble to the specification, a substantially larger number of sections must be combined in a stack. Of course, the invention is not limited in other points either to the examples given by way of example. As types of pulse modulation which were used in the course of the transformation of signals, mention has been made in the examples merely of pulse amplitudes and delta modulation. However, it is also conceivable that the inventive concept can be reduced to practice also with the aid of other types of modulation, such as, for instance, pulse-code modulation.

We claim:

1. A system for transmitting a continuous signal which is split into equal sections and a sequence of the sections is converted into a pulse train having pulse locations corresponding to the length of said sections, with first pulses of said pulse train containing the information of the continuous signal and occurring at least at some of these locations, said system comprising first switch means receiving said continuous signal and dividing it into groups of first sections each having the same number of successive pulse locations, first storage means connected to said first switch means to store said first sections, second switch means connected to said first storage means and generating second sections in the form of AC pulses the frequencies of which are constant during the pulse duration and which lie within a frequency band associated with a pulse location, each group of pulse locations being associated with a selection of frequency bands common to all groups, and second storage means connected to said second switch means to extend the length of the second sections, which extended sections, correspond to the first sections forming a group, at least partially overlap one another chronologically.

2. A system according to claim 1, in which the second switch means further comprises means to delay the second sections with respect to the corresponding first sections belonging to a group by different delay times whereby the second sections corresponding to said group are given off in a stacked manner so that the signal consisting of the second sections can be used within a time multiplex system.

3. A system according to claim 1, further comprising means to produce third signal sections the length of which corresponds to the first sections and the frequencies of which are higher by a constant factor than those of the second signal, said second storage means comprising at least one static analog storage having switch means associated therewith to store said third signal sections additively in the analog storage in such a manner that they are each stored at the same storage places, and read out means which, after a pulse stack has been stored in said analog storage, read out said stored pulse stack at a speed which is less by said constant factor than the speed with which the individual sections were stored.

4. A system according to claim 2, further comprising means to delay said second sections and in which said second switch means further comprise means to associate the same frequency band with more than one second section and delay means to impart to those sections belonging to the same frequency band different delay times so that said second sections follow one another continuously, whereby the signal output consists of a gapless succession of partial stacks containing, in the different frequency bands, each a single second section.

5. A system according to claim 1, in which said first switch means further comprise means to split the continuous signal into a series of pulses of alternating amplitude thus forming said first sections, said second switch means comprising means to fix the frequency of the second sections in each case within the frequency band assigned to them in accordance with the amplitude of the corresponding first sections.

6. A system according to claim 1, further comprising third switch means to evaluate only a relatively short part from each second section received, the start of which is delayed with respect to the start of the second section by a constant amount of time whereby disturbances caused by multiwave propagations, the greatest difference in transmission time of which is smaller than said delay, will be cancelled.

7. A system according to claim 1, in which said first switch means further comprise means to convert the continuous signal into a series of delta-modulated pulses and said second switch means further comprise means to associate a frequency band with each pulse location of the delta modulation.

8. A system according to claim 7, in which said second switch means further comprises means to produce a second section in response to each of said delta-modulated pulses, the frequency of said second sections being in the frequency band associated with the pulse location of the corresponding pulse.

9. A system according to claim 7, in which said second switch means further comprise means which, for each pulse location of the delta modulation, produces a second section the frequency of which, lying within the frequency band associated with it and depends on the production of a pulse at the corresponding pulse location.

* * * * *